(12) United States Patent  
Exton

(10) Patent No.: US 8,939,410 B2
(45) Date of Patent: Jan. 27, 2015

(54) BOUNDARY LAYER FLOW DISRUPTORS FOR DELAYING TRANSITION TO TURBULENT FLOW

(71) Applicant: Reginald J Exton, Williamsburg, VA (US)

(72) Inventor: Reginald J Exton, Williamsburg, VA (US)

(*) Notice: Subject to any disclaimer, the term of this patent is extended or adjusted under 35 U.S.C. 154(b) by 72 days.

(21) Appl. No.: 13/937,494

(22) Filed: Jul. 9, 2013

(65) Prior Publication Data

US 2014/0217241 A1 Aug. 7, 2014

Related U.S. Application Data

(60) Provisional application No. 61/761,278, filed on Feb. 6, 2013.

(51) Int. Cl.
  *B64C 21/10* (2006.01)
  *B64C 3/14* (2006.01)
(52) U.S. Cl.
  CPC ..................................... *B64C 3/141* (2013.01)
  USPC ........................... 244/200; 244/204; 244/130
(58) Field of Classification Search
  USPC ....................................... 244/200; 296/181.5
  See application file for complete search history.

(56) References Cited

U.S. PATENT DOCUMENTS

| | | | | |
|---|---|---|---|---|
| 5,359,574 A | * | 10/1994 | Nadolink | 367/1 |
| 5,598,990 A | * | 2/1997 | Farokhi et al. | 244/200.1 |
| 5,848,769 A | * | 12/1998 | Fronek et al. | 244/200 |
| 5,988,568 A | * | 11/1999 | Drews | 244/200 |
| 6,092,766 A | * | 7/2000 | LaRoche et al. | 244/200 |
| 7,070,850 B2 | * | 7/2006 | Dietz et al. | 428/172 |
| 8,074,938 B2 | * | 12/2011 | Hyde et al. | 244/204 |
| 8,074,939 B2 | * | 12/2011 | Hyde et al. | 244/204 |
| 8,240,609 B2 | * | 8/2012 | Parazzoli et al. | 244/130 |
| 8,302,904 B2 | * | 11/2012 | McKeon et al. | 244/99.8 |
| 8,469,313 B2 | * | 6/2013 | Dong | 244/130 |
| 8,668,166 B2 | * | 3/2014 | Rawlings et al. | 244/130 |
| 8,678,316 B2 | * | 3/2014 | Rawlings et al. | 244/130 |
| 8,684,310 B2 | * | 4/2014 | Rawlings et al. | 244/130 |
| 8,783,337 B2 | * | 7/2014 | Hyde et al. | 165/287 |
| 2009/0294596 A1 | * | 12/2009 | Sinha et al. | 244/200 |
| 2010/0314500 A1 | * | 12/2010 | Wood | 244/200 |
| 2013/0206916 A1 | * | 8/2013 | Kordt | 244/203 |
| 2013/0299637 A1 | * | 11/2013 | Hoffenberg | 244/134 A |
| 2014/0021302 A1 | * | 1/2014 | Gionta et al. | 244/200.1 |
| 2014/0217241 A1 | * | 8/2014 | Exton | 244/200 |

* cited by examiner

*Primary Examiner* — Christopher P Ellis
*Assistant Examiner* — Medhat Badawi
(74) *Attorney, Agent, or Firm* — Peter J. Van Bergen

(57) ABSTRACT

An apparatus delays the transition of a boundary layer flow from laminar to turbulent. Flow disruptors are positioned to be in contact with a boundary layer flow moving in a flow direction over a surface. Each flow disruptor generates fluctuations in the boundary layer flow such that the frequency of the fluctuations is a damping region frequency defined by an amplification rate curve associated with the boundary layer flow.

20 Claims, 4 Drawing Sheets

BOUNDARY LAYER FLOW DISRUPTORS FOR DELAYING TRANSITION TO TURBULENT FLOW

Pursuant to 35 U.S.C. §119, the benefit of priority from provisional application 61/761,278, with a filing date of Feb. 6, 2013, is claimed for this non-provisional application.

STATEMENT OF GOVERNMENT INTEREST

The invention described herein may be manufactured and used by or for the United States Government for United States Government purposes without payment of royalties thereon or therefor.

FIELD OF THE INVENTION

The invention relates generally to delaying the onset of turbulent flow over an aerodynamic surface, and more particularly to the use of flow disruptors on an aerodynamic surface to delay a boundary layer's flow transition from laminar flow to turbulent flow.

BACKGROUND OF THE INVENTION

The design of aircraft is highly dependent on the dynamics of fluid flow around the aircraft. For nearly 100 years, the field of aerodynamics has recognized that the flow in a thin boundary layer on the surface is critical to the efficient design of an aircraft. The flow in the boundary layer is initially smooth (i.e., laminar), but at some point transitions to a turbulent flow. Transition to turbulent flow in flight is due to many factors, including surface condition and acoustical noise. Turbulent flow is undesirable since it brings about increased drag and heat transfer to the aircraft. Thus, systems and methods to delay the laminar-to-turbulent flow transition are a major objective of aerodynamic research.

Decades of research in aerodynamics have shown little progress in delaying a boundary layer's transition to a turbulent condition. Early attempts to modify the boundary layer characteristics have included very thin modifications of the surface such as the addition of sandpaper, tape, or flapping layers. More recent and sophisticated attempts include the addition of small isolated protrusions (or "trips" as they are known) near the leading edge of an aircraft's wing span. Prior efforts have emphasized the separation of the trips or alignment of the trips along the stream-wise direction of the flow in which case the trips are referred to as "riblets". Unfortunately, to date, trip-based modification of a boundary layer flow has only achieved modest amounts of success.

SUMMARY OF THE INVENTION

Accordingly, it is an object of the present invention to provide a method and apparatus for modifying a boundary layer flow in order to delay a laminar-to-turbulent flow transition.

Another object of the present invention is to provide a flow disruptor-based approach for delaying a laminar-to-turbulent flow transition.

Other objects and advantages of the present invention will become more obvious hereinafter in the specification and drawings.

In accordance with the present invention, an apparatus for delaying the transition of a boundary layer flow from laminar to turbulent is provided. A plurality of flow disruptors are positioned to be in contact with a boundary layer flow moving in a flow direction over a surface. Each flow disruptor generates fluctuations in the boundary layer flow. Specifically, the flow disruptors are configured such that the frequency of the fluctuations is a damping region frequency defined by an amplification rate curve associated with the boundary layer flow.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
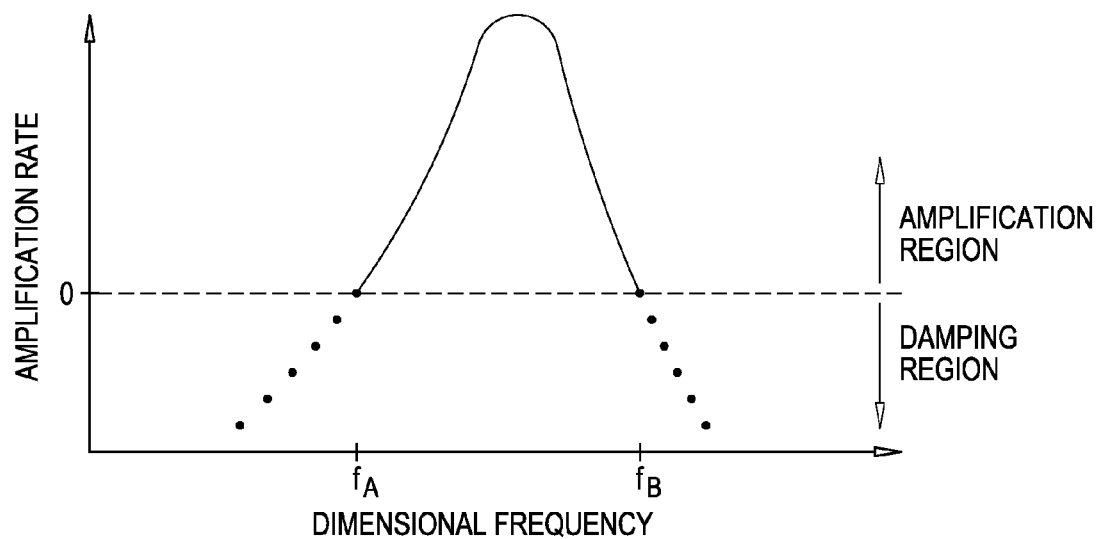
FIG. 1 is a generalized form of an amplification rate curve for a boundary layer flow over a surface.

Prior to describing the boundary layer flow disruptors of the present invention, reference will be made to FIG. 1 where a generalized form of an amplification rate curve for a boundary layer flow over a surface (e.g., an aerodynamic surface) is depicted. Briefly, the curve is a plot of the relative amplification rate versus the dimensional frequency of fluctuations or disturbances in the boundary layer flow. These fluctuations or disturbances arise from many natural influences such as surface imperfections or acoustical influences. While a particular plot is derived from the theoretical stability considerations for a particular speed or range of speeds over a surface, the generalized form is the same for all speeds.

Experimental measurements have verified this general form in the amplification region which is above a relative amplification rate of zero depicted by the horizontal dashed line. The dotted line curves are extrapolations into the damping region lying below the relative amplification rate of zero. Between the amplification region frequencies, denoted $f_A$ and $f_B$, natural fluctuations are amplified causing the flow to become unstable and, ultimately, resulting in the transition of laminar flow to turbulent flow. Natural fluctuations occurring at damping region frequencies lower than frequency $f_A$ or above frequency $f_B$ have a negative amplification rate that damps the flow's natural fluctuations thereby causing the flow to be stable.

The method and apparatus of the present invention involve embedding passive or active flow disruptors in a boundary layer flow. Flow disruptors that are passive in nature are known in the art as trips. The dimensions (i.e., height) of passive trips in the present invention are a fraction of the boundary layer thickness thereby keeping them fully immersed and only partially extending into the boundary layer. Passive trips are physical structures mounted on an aerodynamic surface, and are sized and shaped in accordance with the present invention to create strong/dominant instabilities in the negative amplification rate or damping region of the amplification rate curve, i.e., at frequencies less than $f_A$ or greater than $f_B$ (FIG. 1). Active flow disruptors are mounted flush with an aerodynamic surface and are operated to generate strong/dominant instabilities in the negative amplification rate or damping region of the amplification rate curve, i.e., at frequencies less than $f_A$ or greater than $f_B$ (FIG. 1).

Passive or active flow disruptors generate instabilities (fluctuations) in the boundary layer at a specific/forced frequency such that the instabilities (fluctuations) act as boundary layer stabilizers. That is, the flow disruptors, either passive or active, create strong/dominant instabilities in the negative amplification rate or fluctuation damping region of the amplification rate curve. The specific/forced frequencies will be referred to herein as damping region frequencies or $f_D$. By forcing the frequency of the fluctuations in the boundary layer into the damping region of the amplification rate curve, flow disruptors in accordance with the present invention will delay laminar-to-turbulent flow transition for a selected speed or range of speeds. For example, flow disruptors for an aircraft could be designed to provide a damping region frequency associated with the aircraft's cruise regime of flight thereby saving fuel during the aircraft's longest window of operation. The flow disruptors could also be used on supersonic/hypersonic missiles to increase the operational range thereof.

As mentioned above, flow disruptors in accordance with the present invention can be passive or active. However, in all cases, the flow disruptors are aligned along a direction that is perpendicular or approximately perpendicular to the flow direction of a boundary layer flow in which the flow disruptors are embedded and/or in contact with.

Figure 2A:
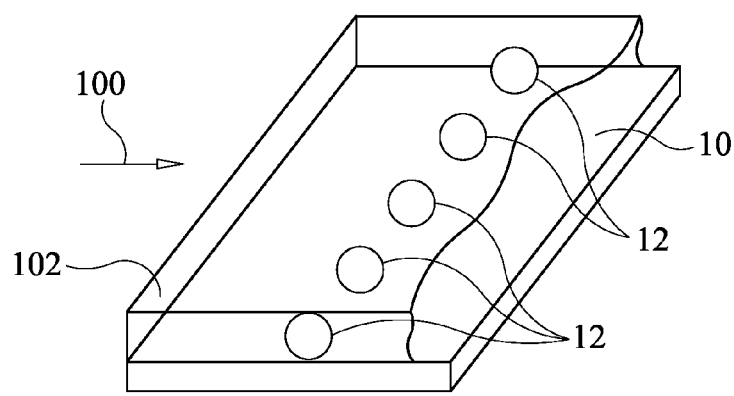
FIG. 2A is a perspective view of a row of isolated, spherical passive trips on an aerodynamic surface in accordance with an embodiment of the present invention.
Figure 2B:
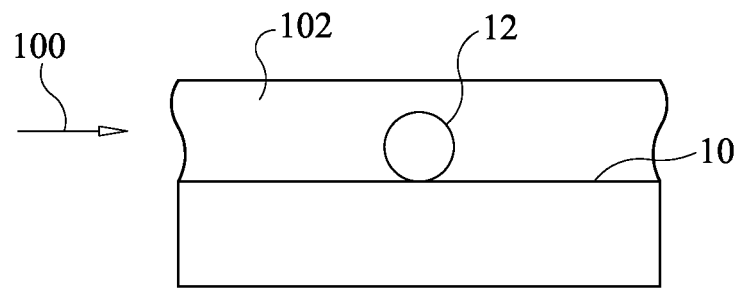
FIG. 2B is a side view of a single spherical trip on the aerodynamic surface illustrated in FIG. 2A.
Figure 2C:
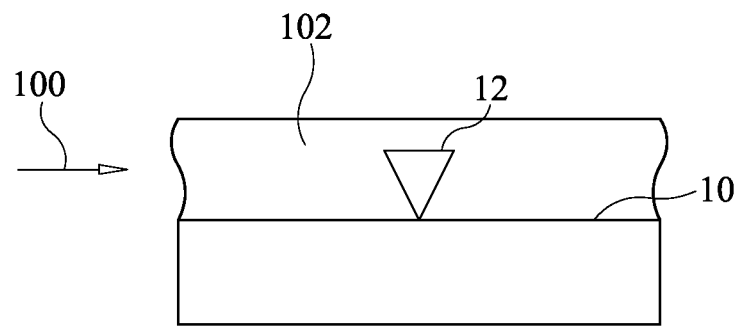
FIG. 2C is a side view of a single conical or triangular trip on an aerodynamic surface.
Figure 2D:
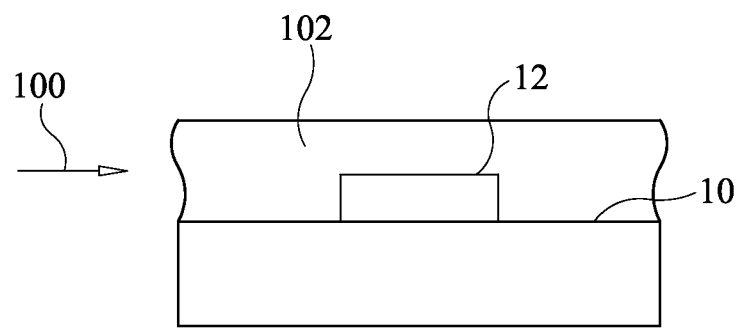
FIG. 2D is a side view of a single rectangular trip on an aerodynamic surface.
Figure 2E:
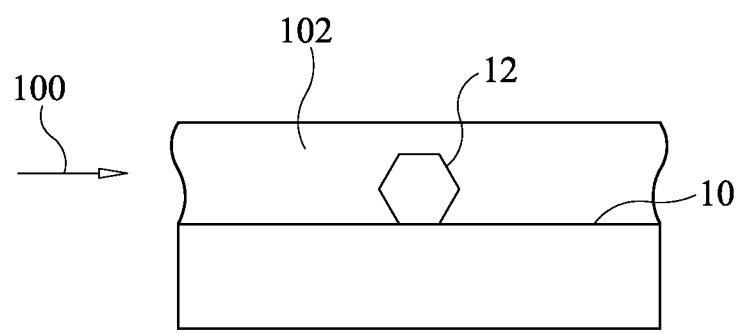
FIG. 2E is a side view of a single polygonal trip on an aerodynamic surface.

Referring now to FIGS. 2A and 2B, an aerodynamic surface 10 is shown with a row of isolated, spherical passive trips 12 mounted thereon and aligned substantially perpendicular to the flow direction 100 of a boundary layer flow 102 moving over aerodynamic surface 10. The shape of each trip 12 can be spherical (as shown), but the present invention is not so limited as a variety of other geometrically shaped trips 12 (e.g., inverted conical or triangular in FIG. 2C, rectangular in FIG. 2D, polygonal in FIG. 2E, etc.) could be used without departing from the scope of the present invention. It is to be understood that the orientations of such geometrically-shaped trips (i.e., relative to aerodynamic surface 10 and/or flow direction 100) could be different than those shown without departing from the scope of the present invention. Further, although one row of trips 12 is shown, it is to be understood that additional rows are contemplated by the present invention.

The isolated trip design illustrated in FIGS. 2A-2B generates damping region frequencies via vortex shedding from each individual trip. The damping region frequency $f_D$ relationship for the isolated trip embodiment is given by $$f_D = S(U/d)$$

where S is the Strouhal number, typically S=0.185;

U is the local flow velocity within the boundary layer around the trip; and d is the effective diameter of the trip. Thus, for a given flow velocity within the boundary layer that can be readily determined for an aircraft speed (e.g., the aircraft's cruise regime), the trip can be sized to generate flow-induced fluctuations at the desired damping region frequency. Since there will be some frequency overlap in the damping region frequencies of amplification rate curves associated with a range of operating speeds, passive trips can be designed for a damping frequency $f_D$ that is common for a range of operating speeds.

Figure 3A:
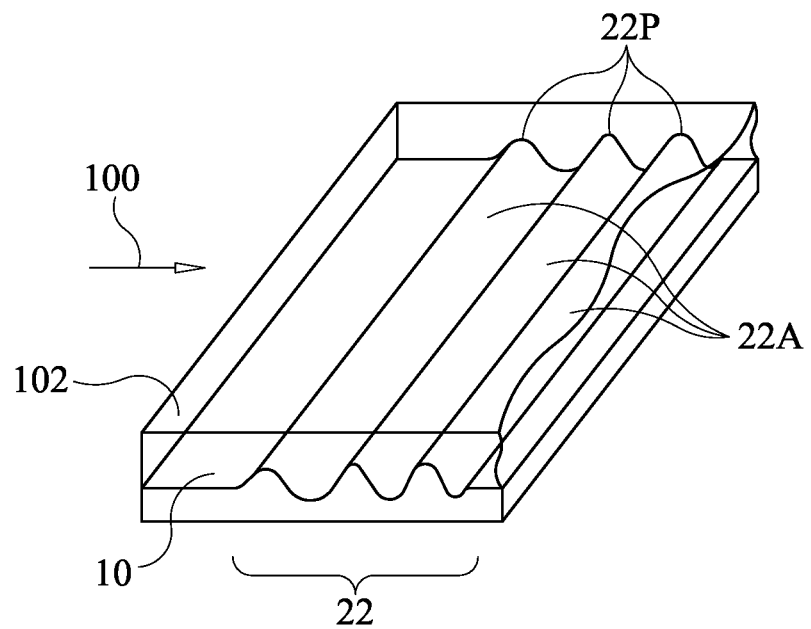
FIG. 3A is a perspective view of a corrugated surface trip region on an aerodynamic surface in accordance with another embodiment of the present invention.
Figure 3B:
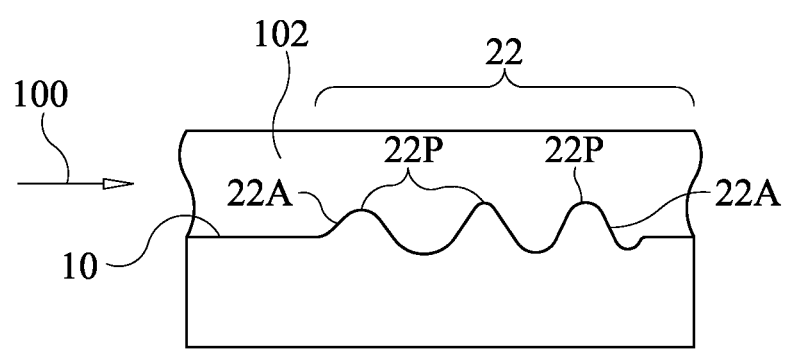
FIG. 3B is a side view of the corrugated surface trip region and the aerodynamic surface illustrated in FIG. 3A.

Another type of passive trip design is the corrugated surface trip illustrated in FIGS. 3A and 3B where aerodynamic surface 10 incorporates a corrugated surface region 22 defined by similarly sized/shaped longitudinally-extending and parallel ridges 22A, each of which has a peak 22P that extends up partially into boundary layer 102. The cross-sectional shape of ridges 22A in region 22 is not a limitation of the present invention. In this embodiment, the damping region frequency $f_D$ relationship is given by $$f_D = U/s$$

where U is the local flow velocity across the top of the corrugated surface region; and s is the corrugation interval or the distance between adjacent peaks 22P.

The corrugation interval could be fixed or varied along a chord of aerodynamic surface 10 without departing from the scope of the present invention. Varying the corrugation interval in a corrugated surface region could be used to completely prevent the laminar-to-turbulent flow transition.

Figure 4A:
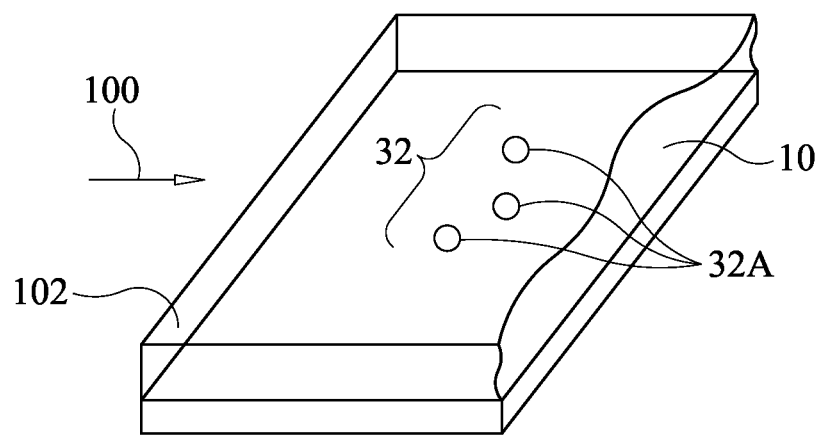
FIG. 4A is a perspective view of an active flow disruptor region at an aerodynamic surface in accordance with another embodiment of the present invention.
Figure 4B:
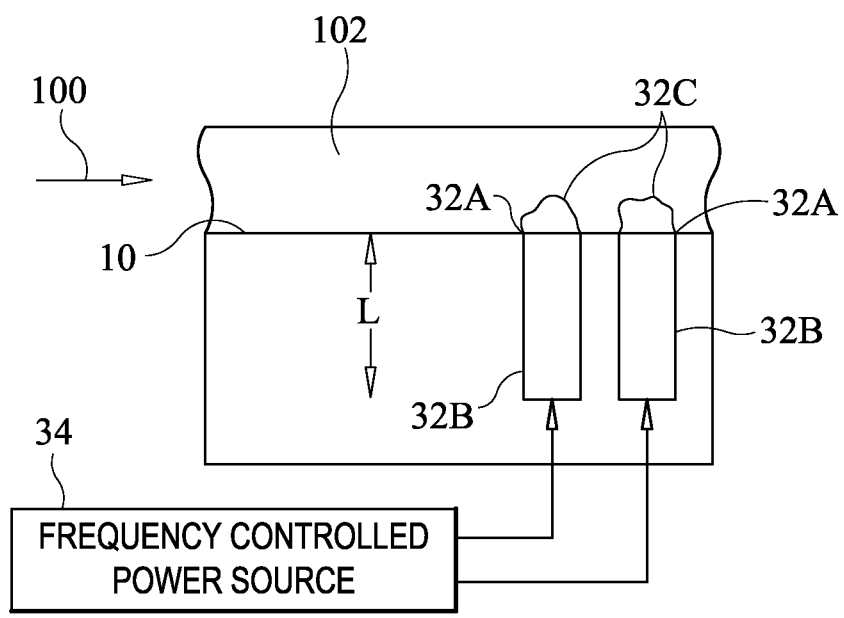
FIG. 4B is a side view of the active flow disruptor region and the aerodynamic surface illustrated in FIG. 4A.

As mentioned above, the present invention can also utilize active flow disruptors to generate the desired damping region fluctuations. By way of example, FIGS. 4A and 4B depict a region 32 of spaced-apart active flow disruptors 32A that can be realized by microwave antennas or high voltage electrodes embedded in an aerodynamic surface to be flush therewith and in contact with boundary layer flow 102. For example, each active flow disruptor 32A can be the end of a monopole antenna 32B whose length "L" (as shown in FIG. 4B) determines the antenna's resonance frequency. Flow disruptors 32A can be arranged longitudinally along aerodynamic surface 10 such that they are perpendicular or substantially perpendicular to the flow direction 100 of boundary layer flow 102 as shown. However, the present invention is not so limited as flow disruptors 32A can be staggered (as shown) along aerodynamic surface 10 or otherwise positioned thereat to achieve optimum performance.

The surface discharges (or plasmas) 32C generated by active flow disruptors 32A (e.g., the end of monopole antenna 32B) can be electronically programmed (e.g., via a controlled power source 34 coupled thereto) to generate damping fluctuations whose frequency can be varied if desired. Each antenna 32B could be powered individually or "sympathetically" (i.e., unconnected antennas siphoning power from adjacent powered antennas) without departing from the scope of the present invention.

Active flow disruptors can be used alone (as shown) or used to supplement passive trips. For example, alternating rows of passive trips and active flow disruptors could be used. Another option would be to use a single active flow disruptor in combination with multiple passive trips to "tweak" the generated/induced fluctuations to improve the operational range of the present invention. Active flow disruptors can also be employed on surface areas that are difficult to access, or where variability in the frequency is desired. Active flow disruptors can operate at any desired frequency, add no drag to the flow, and may provide the ultimate in programmable flow control. In this case, the damping region frequency $f_D$ is simply the disruptor's discharge (or plasma) frequency.

The advantages of the present invention are numerous. Specifically sized passive trips (e.g., isolated, corrugated surface, etc.) generate instabilities in boundary layer flow at specific, forced frequencies in the damping region of the amplification rate spectrum. The result is a stabilization of the boundary layer flow and delay of its transition from laminar to turbulent flow. Forced instabilities using active flow disruptors may be particularly useful in augmenting passive trips. Application of the concept to shaped wings and fuselages will result in increased fuel efficiency and flight control, while application of the concept to missiles will result in increased operational range.

Although the invention has been described relative to specific embodiments thereof, there are numerous variations and modifications that will be readily apparent to those skilled in the art in light of the above teachings. It is therefore to be understood that the invention may be practiced other than as specifically described.

What is claimed as new and desired to be secured by Letters Patent of the United States is:

1. An apparatus for delaying the transition of a boundary layer flow from laminar to turbulent, comprising:
   a plurality of flow disruptors adapted to be in contact with a boundary layer flow moving in a flow direction over a surface, each of said flow disruptors generating fluctuations in the boundary layer flow at a frequency that is a damping region frequency defined by an amplification rate curve associated with the boundary layer flow.

2. An apparatus as in claim 1, wherein said plurality of flow disruptors are arranged approximately perpendicular to the flow direction of the boundary layer flow.

3. An apparatus as in claim 1, wherein each of said flow disruptors comprises a physical structure adapted to be coupled to the surface and extending only partially into the boundary layer flow.

4. An apparatus as in claim 3, wherein said physical structure comprises a shape selected from the group consisting of spherical shapes, conical shapes, triangular shapes, rectangular shapes and polygonal shapes.

5. An apparatus as in claim 4, wherein said frequency of said fluctuations satisfies the relationship S(U/d) where S is the Strouhal number, U is the flow velocity of the boundary layer flow at said spherical shapes, and d is the diameter of said spherical shapes.

6. An apparatus as in claim 2, wherein said plurality of flow disruptors comprises a plurality of longitudinally-extending parallel ridges.

7. An apparatus as in claim 6, wherein said frequency of said fluctuations satisfies the relationship U/s where U is the flow velocity of the boundary layer flow across peaks of said ridges and s is the distance between adjacent ones of said peaks.

8. An apparatus as in claim 1, wherein each of said flow disruptors comprises a plasma discharge element adapted to be mounted in the surface and flush therewith.

9. An apparatus for delaying the transition of a boundary layer flow from laminar to turbulent, comprising:
   a plurality of flow disruptors adapted to be in contact with a boundary layer flow moving at a velocity in a flow direction over a surface and arranged approximately perpendicular to the flow direction, each of said flow disruptors generating fluctuations in the boundary layer flow at a frequency that is a damping region frequency defined by an amplification rate curve associated with the boundary layer flow at the velocity.

10. An apparatus as in claim 9, wherein each of said flow disruptors comprises a physical structure adapted to be coupled to the surface and extending only partially into the boundary layer flow.

11. An apparatus as in claim 10, wherein said physical structure comprises a shape selected from the group consisting of spherical shapes, conical shapes, triangular shapes, rectangular shapes and polygonal shapes.

12. An apparatus as in claim 11, wherein said frequency of said fluctuations satisfies the relationship S(U/d) where S is the Strouhal number, U is the velocity of the boundary layer flow at said spherical shapes, and d is the diameter of said spherical shapes.

13. An apparatus as in claim 9, wherein said plurality of flow disruptors comprises a plurality of longitudinally-extending parallel ridges.

14. An apparatus as in claim 13, wherein said frequency of said fluctuations satisfies the relationship U/s where U is the velocity of the boundary layer flow across peaks of said ridges and s is the distance between adjacent ones of said peaks.

15. An apparatus as in claim 9, wherein each of said flow disruptors comprises a plasma discharge element adapted to be mounted in the surface and flush therewith.

16. An apparatus for delaying the transition of a boundary layer flow from laminar to turbulent, comprising:
   a plurality of flow disruptors adapted to be in contact with a boundary layer flow moving at a velocity in a flow direction over a surface and arranged approximately perpendicular to the flow direction, each of said flow disruptors generating fluctuations in the boundary layer flow at a frequency that is a damping region frequency defined by an amplification rate curve associated with the boundary layer flow at the velocity; and
   each of said flow disruptors selected from the group consisting of (i) a physical structure adapted to be coupled to the surface and extending only partially into the boundary layer flow, and (ii) a plasma discharge element adapted to be mounted in the surface and flush therewith.

17. An apparatus as in claim 16, wherein said physical structure comprises a shape selected from the group consisting of spherical shapes, conical shapes, triangular shapes, rectangular shapes and polygonal shapes.

18. An apparatus as in claim 17, wherein said frequency of said fluctuations satisfies the relationship S(U/d) where S is the Strouhal number, U is the velocity of the boundary layer flow at said spherical shapes, and d is the diameter of said spherical shapes.

19. An apparatus as in claim 16, wherein said physical structure comprises longitudinally-extending parallel ridges.

20. An apparatus as in claim 19, wherein said frequency of said fluctuations satisfies the relationship U/s where U is the velocity of the boundary layer flow across peaks of said ridges and s is the distance between adjacent ones of said peaks.

* * * * *